(12) United States Patent
Manuel-Devadoss

(10) Patent No.: US 12,314,849 B2
(45) Date of Patent: May 27, 2025

(54) SMART PRODUCTION SYSTEM

(71) Applicant: Oracle International Corporation, Redwood Shores, CA (US)

(72) Inventor: Johnson Manuel-Devadoss, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1112 days.

(21) Appl. No.: 17/199,834

(22) Filed: Mar. 12, 2021

(65) Prior Publication Data

US 2022/0292343 A1  Sep. 15, 2022

(51) Int. Cl.
*H04L 9/00* (2022.01)
*G06F 18/21* (2023.01)
(Continued)

(52) U.S. Cl.
CPC ............. *G06N 3/08* (2013.01); *G06F 18/217* (2023.01); *G06N 3/045* (2023.01); *H04L 9/3213* (2013.01);
(Continued)

(58) Field of Classification Search
CPC .......... G06N 3/08; G06N 3/045; G06N 3/047; G06N 3/084; G06F 18/217; G06F 21/445;
(Continued)

(56) References Cited

U.S. PATENT DOCUMENTS 10,095,888 B1  10/2018  Lee et al.
10,705,985 B1   7/2020  Pollak et al.
(Continued)

FOREIGN PATENT DOCUMENTS

| CN | 110557384 A | 12/2019 |
|---|---|---|
| WO | 2019217323 A1 | 11/2019 |
| WO | 2021132483 A1 | 7/2021 |

OTHER PUBLICATIONS

Notification of Transmittal of the International Search Report and the Written Opinion of the International Searching Authority mailed Jul. 4, 2022 in PCT/US2022/016436.
(Continued)

*Primary Examiner* — Syed M Ahsan
(74) *Attorney, Agent, or Firm* — Potomac Law Group, PLLC

(57) ABSTRACT

Embodiments couple a corresponding IoT gateway to each IoT device, each IoT gateway monitoring for operation events of a smart contract of a distributed ledger, each IoT device and IoT gateway coupled to the distributed ledger. In response to a client initiating an operation of a first IoT device, embodiments generate a corresponding event by the smart contract and transmit an authorization request to an authorization system and in response receive an access token corresponding to the operation. Embodiments transmit the access token to one or more of the IoT gateways, each IoT gateway monitoring for the event and determining whether it corresponds to the first IoT device and then implementing the operation at the first IoT device. Embodiments determine a defect in any of the IoT devices using a trained Deep Convolutional Generative Adversarial Network ("DC-GAN") model coupled to the distributed ledger.

20 Claims, 5 Drawing Sheets

(51) Int. Cl.
    *G06N 3/045*     (2023.01)
    *G06N 3/08*     (2023.01)
    *H04L 9/32*     (2006.01)
    *H04L 12/66*     (2006.01)
    *H04L 67/125*     (2022.01)

(52) U.S. Cl.
    CPC ............ *H04L 12/66* (2013.01); *H04L 67/125* (2013.01); *H04L 9/50* (2022.05)

(58) Field of Classification Search
    CPC ..... H04L 9/3213; H04L 12/66; H04L 67/125; H04L 9/50; H04L 63/205; H04L 63/104
    See application file for complete search history.

(56) References Cited

U.S. PATENT DOCUMENTS

| | | | |
|---|---|---|---|
| 10,909,525 | B1 | 2/2021 | Dhodapkar et al. |
| 11,087,215 | B1 | 8/2021 | Chen |
| 11,392,947 | B1 | 7/2022 | Prasad et al. |
| 11,829,961 | B1 * | 11/2023 | Wood ................. H04L 9/50 |
| 2012/0240224 | A1 | 9/2012 | Payne et al. |
| 2017/0257664 | A1 | 9/2017 | Tam et al. |
| 2019/0334886 | A1 | 10/2019 | Lelcuk et al. |
| 2019/0385159 | A1 | 12/2019 | Beatty et al. |
| 2020/0021873 | A1 | 1/2020 | Swaminathan et al. |
| 2020/0145214 | A1 | 5/2020 | Linton et al. |
| 2020/0184106 | A1 | 6/2020 | Oliveira et al. |
| 2020/0304318 | A1 | 9/2020 | Kravitz et al. |
| 2020/0348662 | A1 * | 11/2020 | Cella ............... G05B 19/41865 |
| 2021/0042161 | A1 | 2/2021 | Salchow et al. |
| 2021/0099474 | A1 | 4/2021 | Huang et al. |
| 2021/0160233 | A1 | 5/2021 | Biyani et al. |
| 2021/0303927 | A1 * | 9/2021 | Li ........................ G06V 10/764 |
| 2022/0130411 | A1 | 4/2022 | Lu et al. |
| 2022/0169258 | A1 | 6/2022 | Samarthyam et al. |
| 2022/0172050 | A1 | 6/2022 | Dalli et al. |
| 2022/0172202 | A1 | 6/2022 | Wedmore et al. |
| 2022/0294690 | A1 | 9/2022 | Nolan et al. |

OTHER PUBLICATIONS

Notification of Transmittal of the international search report and written opinion of the international searching author, or the declaration mailed to Oracle International Searching Authority on May 20, 2022 for PCT/US2022/016434.

Garrocho et al., Industry 4.0: Smart Contract0based Industrial Internet of Things Process Management, Minas Gerais Federal Institute of Education, Science and Technology, Ouro Branco, Minas Gerais, BrazilComputer Science Department, Federal University of Ouro Preto, Minas Gerais, Brazil, 2019.

Hammi et al., Bubbles of trust: A decentralized blockchain-based authentication system for iot,Computers and Security, vol. 78, pp. 126-142, 2018).

Hanada et al., Smart contracts for machine-to-machine communication: Possibilities and limitations, in 2018 IEEE International Conference on Internet of Things and Intelligence System(IOTAIS), Nov. 2018, pp. 130-136.

Novo et al., Blockchain meets iot: An architecture for scalable access management in iot, IEEE Internet of Things Journal, vol. 5, No. 2, pp. 1184-1195, Apr. 2018.

Bourzerabib et al., "A Blockchain Data Balance Using a Generative Adversarial Network Approach: Application to Smart House IDS," 2020 International Conference on Advanced Aspects of Software Engineering (ICAASE), Nov. 28, 2020 (Year: 2020).

Zouina et al., "Towards a distributed token based payment system using blockchain technology," 2019 International Conference on Advanced Communication Technologies and Networking (CommNet) (pp. 1-10), Apr. 1, 2019 (Year: 2019).

* cited by examiner

SMART PRODUCTION SYSTEM

FIELD

One embodiment is directed generally to a manufacturing/production system, and in particular to control and management of distributed devices in a production environment.

BACKGROUND INFORMATION

Smart production (also referred to as "smart manufacturing", "smart factory" or "Industry 4.0") is the ongoing automation of traditional manufacturing and industrial practices, using modern smart technology. Large-scale machine-to-machine communication ("M2M") and the Internet of Things ("IoT") are integrated for increased automation, improved communication and self-monitoring, and production of smart machines that can analyze and diagnose issues without the need for human intervention.

Industry 4.0 at a high level can be summarized into four major components: cyber-physical systems, IoT, on-demand availability of computer system resources and cognitive computing. Industry 4.0 networks a wide range of new technologies to create value. Using cyber-physical systems that monitor physical processes, a virtual copy of the physical world can be designed. Characteristics of cyber-physical systems include the ability to make decentralized decisions independently, reaching a high degree of autonomy.

SUMMARY

Embodiments monitor a plurality of industrial Internet of Things ("IoT") devices, using a distributed ledger. Embodiments couple a corresponding IoT gateway to each IoT device, each IoT gateway monitoring for operation events of a smart contract of the distributed ledger, each IoT device and IoT gateway coupled to the distributed ledger. In response to a client initiating an operation of a first IoT device, embodiments generate a corresponding event by the smart contract and transmit an authorization request to an authorization system and in response receive an access token corresponding to the operation. Embodiments transmit the access token to one or more of the IoT gateways, each IoT gateway monitoring for the event and determining whether it corresponds to the first IoT device and then implementing the operation at the first IoT device.

Embodiments determine a defect in any of the IoT devices using a trained Deep Convolutional Generative Adversarial Network ("DCGAN") model coupled to the distributed ledger and comprising a corresponding discriminator and generator for each of the IoT devices, each of the IoT devices having a normal distribution set of data points, the DCGAN model monitoring transmitted data points from each of the IoT devices and detecting when the transmitted data points do not correspond to the normal distribution set of data points.

DETAILED DESCRIPTION

In a smart production environment/network, embodiments implement distributed blockchain ledgers with a proof-of-eligibility consensus algorithm that uses a token-based two-steps access control. Embodiments provide the decentralized trust to track and avoid any fraud in manufacturing and also to detect the defects in parts, implemented as Internet of Things ("IoT") devices, at even earlier stages through inline quality control using a machine learning algorithm, as well as detecting and thwarting attacks on any of the IoT devices or other elements of the distributed smart production network.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
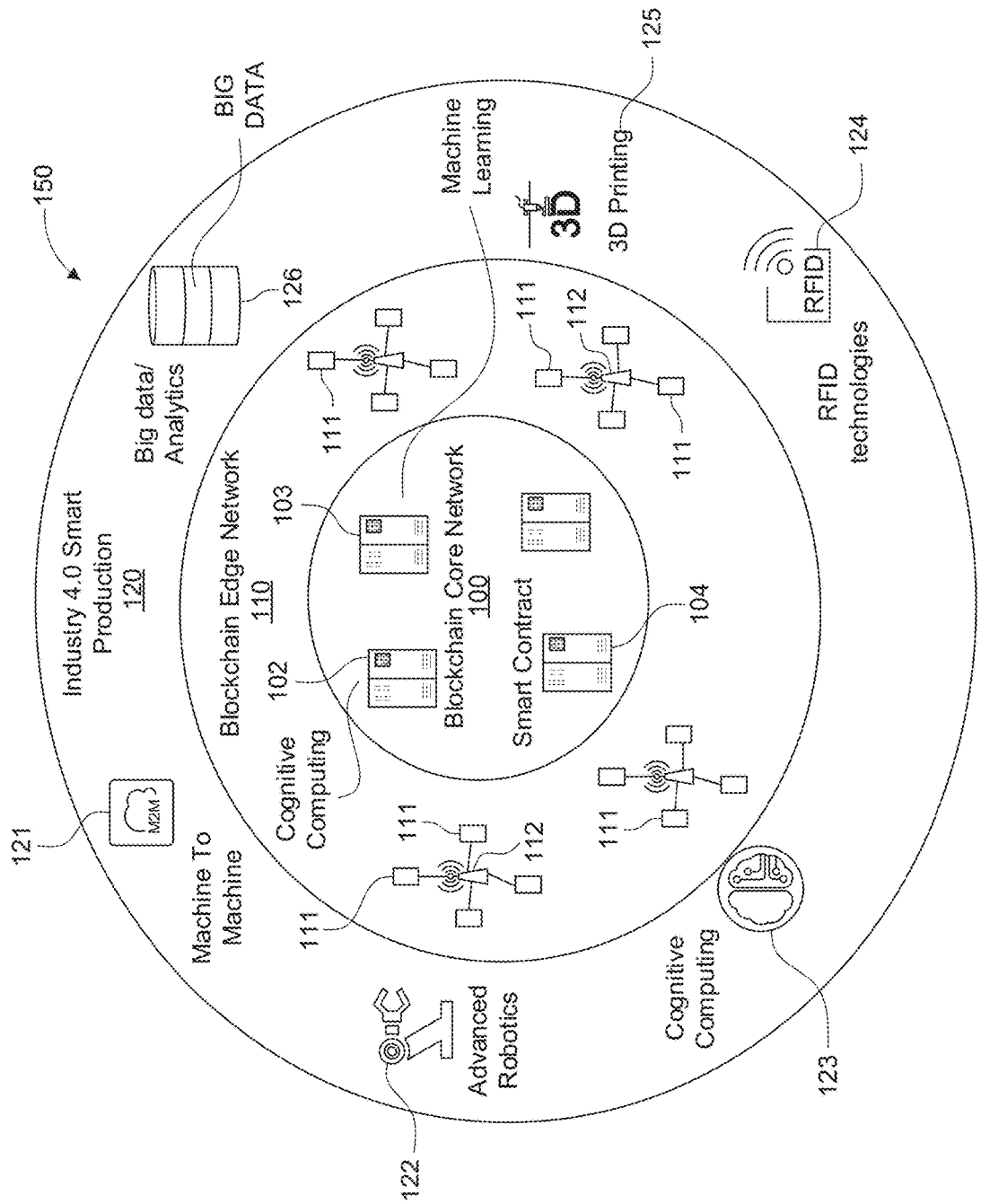
FIG. 1 is an overview diagram of elements of a smart production system that can implement embodiments of the invention.

FIG. 1 is an overview diagram of elements of a smart production system 150 that can implement embodiments of the invention. System 150, at its inner core, includes the blockchain core network 100, or generally the blockchain network or blockchain. Blockchain 100 is a peer-to-peer network that eliminates a number of risks that come with data being held centrally. The decentralized blockchain may use ad hoc message passing and distributed networking. Peer-to-peer blockchain networks lack centralized points of vulnerability that computer crackers can exploit; likewise, it has no central point of failure.

Blockchain security methods include the use of public-key cryptography. A public key (i.e., a long, random-looking string of numbers) is an address on the blockchain. Value tokens sent across the network are recorded as belonging to that address. A private key is similar to a password that gives its owner access to their digital assets or the means to otherwise interact with the various capabilities that blockchains now support. Data stored on the blockchain is generally considered incorruptible.

Every node in a decentralized system has a copy of the blockchain. Data quality is maintained by massive database replication and computational trust. No centralized "official" copy exists and no user is "trusted" more than any other. Transactions are broadcast to the network using software. Messages are delivered on a best-effort basis. Mining nodes validate transactions, add them to the block they are building, and then broadcast the completed block to other nodes.

Included in the blockchain in embodiments is cognitive computing server(s) 102 and machine learning server(s) 103, each of which use Artificial Intelligence ("AI") and machine learning to enhance the operation of the blockchain. In one embodiment, server 103 implements a Deep Convolutional Generative Adversarial Network ("DC-GAN"). Also included is a smart contract server 104 for generating a smart contract that generates events. A smart contract, in general, is a general purpose computation that takes place on, and is supported by, a blockchain or distributed ledger. A smart contract gets executed by a quorum of blockchain nodes independently in order to record the latest program state and as a result of processing transactions that are submitted by the user. A blockchain transaction has a designated target smart contract function, a payload that contains input values to the function call, and is always signed by the submitter. A transaction can be submitted to any node in the blockchain network, which broadcasts it to the entire network so all the nodes will see the transaction. At some point, the transaction gets processed by each individual node using the executable program in the target smart contract. If the transaction execution is successful, the internal state of the blockchain will be updated. A smart contract may also consider the input to be invalid and reject the transaction as failed, in which case the state is not affected.

System 150 further includes a blockchain edge network 110 that includes elements that directly interact with blockchain 110. In general, the elements include multiple groupings of IoT sensors/devices 111 connected to an IoT gateway 112 and connected in a distributed, decentralized manner.

At an outer band 120 are elements that can form an Industry 4.0 Smart Production system, or any type of smart manufacturing system. Each of the elements would include at least one corresponding IoT device 111 communicating with a corresponding IoT gateway 112. Smart manufacturing elements shown in system 150 includes smart/IoT devices such as machine-to-machine elements 121, advanced robotics 122, cognitive computing 123, radio-frequency identification ("RFID") technologies 124, 3D printing 125, big data/analytics 126. Any other smart manufacturing element can be included in system 150.

An IoT device 111 can be any device that has a sensor attached to it and can transmit data from one object to another or to people with the help of the Internet. IoT devices 111 include wireless sensors, software, actuators, and computer devices. They are attached to a particular object that operates through the Internet, enabling the transfer of data among objects or people automatically without human intervention. Each of sensors 111 can include a processor/controller, and a communication interface that uses protocols such as Modbus, Zigbee, or proprietary protocols, to connect to an gateway 112.

Gateway 112 communicates with different types of sensors/devices using different protocols and then sends the data to a cloud service using a standard protocol. The gateway acts as a filter for the large amount of data sent by the devices, processing the data and sending only relevant information to the cloud. Therefore, the processing and storage services is utilized optimally so that the need for processing and storage is reduced. Further, the response time for the sensors is considerably reduced. The nearby gateway receives the sensor data, processes it, and sends relevant commands back to the sensors. Further, gateways 112 are highly secure and they also help secure the sensors and devices that are connected to them.

System 150 illustrates Machine-to-Machine ("M2M") communications among each of the manufacturing/industrial devices, such as robotics 122, each of which has a corresponding IoT sensor, and is collectively referred to as a smart device, an IoT device, or an Industrial IoT device ("IIoT"). As disclosed, system 150 implements a blockchain with a smart contract. The smart contract allows users to execute a script on the blockchain network in a verifiable way and allows many problems to be solved in a way that minimizes the need for trust. To do so, it allows users to place trust directly in the deterministic protocols and promises specified in a smart contract, rather than in a third party.

A smart contract has its own address and account on the blockchain. Consequently, it can maintain its own state and take ownership of assets on the blockchain, which allows it to act as an escrow. Smart contracts expose an interface of functions to the network that can be triggered by sending transactions to the smart contract. Because a smart contract resides on the blockchain, each node can view and execute its instructions, as well as see the log of each interaction with each smart contract. A smart contract acts as an autonomous entity on the blockchain that can deterministically execute logic expressed as functions of the data that is provided to it on the blockchain.

Figure 2:
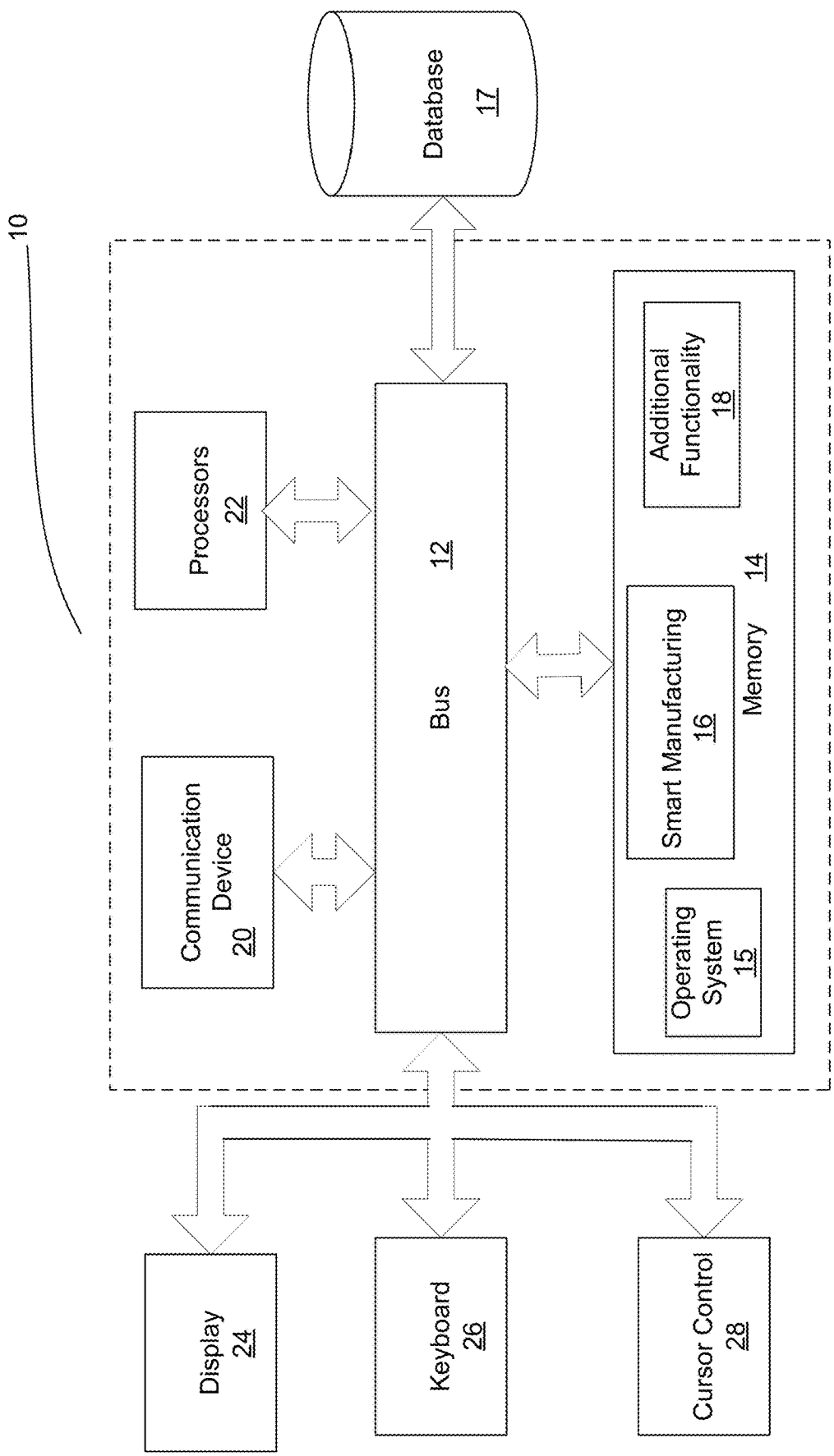
FIG. 2 is a block diagram of the smart manufacturing system of FIG. 1 in the form of a computer server/system in accordance with an embodiment of the present invention.

FIG. 2 is a block diagram of a smart manufacturing system 10 of FIG. 1 in the form of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. System 10 can be used to implement any of the components shown in FIG. 1 and/or interact with any of the components.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD") and includes a microphone for receiving user utterances. A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a smart manufacturing module 16 that implements smart manufacturing, and all other functionality disclosed herein. System 10 can be part of a larger system. Therefore, system 10 can include one or more additional functional modules 18 to include the additional functionality, such as any other Industry 4.0 solutions. A file storage device or database 17 is coupled to bus 12 to provide centralized storage for modules 16 and 18, including data regarding any type of issues generated by each of instances/pods 101. In one embodiment, database 17 is a relational database management system ("RDBMS") that can use Structured Query Language ("SQL") to manage the stored data.

In one embodiment, particularly when there are a large number of distributed files at a single device, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based system, a software-as-a-service ("SaaS") architecture, or other type of computing solution.

In general, operation technology ("OT") refers to hardware and software that detects or causes a change through the direct monitoring and/or control of physical devices, processes and events in the enterprise. For example, OT networks interconnect industrial control systems such as programmable logic controllers, supervisory control and data acquisition systems, distributed control systems, process control domains, safety instrumented systems, and building management and automation systems. Increasingly, OT environments are being connected to implement smart manufacturing in, for example, Industry 4.0 implementations.

However, with production systems becoming more interconnected, the exposure to cyber incidents increases. Attacks and disruptions on critical infrastructure put reputation, production, people and profits at risk. Traditionally, OT networks have operated separately from IT networks. For example, OT networks utilized proprietary protocols optimized for the required functions, some of which have become adopted as "standard" industrial communications protocols (e.g., DP3, Modbus, Profibus, RTU, CANBUS, HART, DeviceNet). More recently, IT-standard network protocols are being implemented in OT devices and systems to reduce complexity and increase compatibility with more traditional IT hardware (e.g., TCP/IP). This has led to a demonstrable reduction in security for OT systems.

Network security systems are designed to protect critical infrastructure, control systems and OT assets from cyber threats and vulnerabilities by monitoring and blocking malicious activity and misconfiguration to promote OT safety and protect productivity. Device authentication is one technique used by network security systems to provide security control. Devices in the network are assigned a unique token that the respective device provides to the network security system for authentication. Once a device has been authenticated, the network security system provides the device with an access token that enables the device to access services until the access token expires. However, one problem with this technique is that the device itself may be tampered with, while still retaining its unique token. As a result, the tampered with device would be able to properly authenticate with the network security system and the tampering would likely not be detected.

In contrast embodiments provide decentralized trust to track and avoid any fraud in manufacturing at the early stages to save production cost using Distributed Ledger Technologies ("DLT") (e.g., blockchain) with a proof-of-eligibility consensus algorithm that uses a token-based two-steps access control. Embodiments provide the decentralized trust to track and avoid any fraud in manufacturing and also detect the defects in parts at even earlier stages through inline quality control using a machine learning algorithm such as a Deep Convolutional Generative Adversarial Network ("DCGAN") using training models simultaneously by an adversarial process where a generator learns to create the IoT device images that look real, while a discriminator learns to tell real images apart from fakes to determine the defects in the IoT device.

In one embodiment, the core components to implement the invention include the blockchain infrastructure 100, smart contract 104 that generates events, IoT devices 111 (i.e., the IoT sensor 111 and corresponding smart manufacturing device), IoT gateways 112, and a DCGAN (machine learning 103) model that detects the defects in IoT devices at even earlier stages. However, in other embodiments, the core component is one or more smart manufacturing servers that executes functionality to interact with the blockchain infrastructure, the smart contract that generates events, IoT devices, IoT gateways, and the DCGAN, with the smart manufacturing servers implemented by system 10 of FIG. 2 and executing all additional functionality disclosed herein.

All client interactions between IoT gateways 112 and the smart manufacturing devices (e.g., robotics 122, 3D printing 125, etc. with corresponding IoT sensors 111) take place through blockchain 100 (or other type of distributed ledger) to establish a decentralized trust mechanism in the supply chain to track and avoid fraud and detect defects. In embodiments, all IoT device operations are mapped to an operation/function in a smart contract and every time a client properly invokes a function the smart contract generates the corresponding blockchain events. A "client" can be considered any entity that requests an operation/functionality be performed by one or more of the IoT devices. Examples of clients include a Voice Controller, Smart Lock, Mobile Robot, Smart Light Switch, Air Quality Monitor, Air Pollution Monitor, Smoke Alarm, Thermostat Easy Temperature Control, Hue Bulbs and Lighting System, IoT Security Solution, Doorbell, Smart Plug, Universal Remote, Wi-Fi with Headers, Mesh Wi-Fi System, TankTrack, Smart Water Assistant, CPS, machines, sensors, Wi-Fi smart devices, Bluetooth smart devices, LoRa devices, heavy machineries, Smart Transportation, appliances, monitoring and automation, wearables, etc. These events are received by interested IoT gateways and eventually result in an operation in the appropriate IoT devices.

Each client and corresponding IoT gateways can be DLT full nodes themselves or they can be connected to the blockchain through another full node that is acting as a remote procedural call ("RPC") server (i.e., a service provider). For example, the service provider in one embodiment is the "Oracle Internet of Things (IoT) Cloud Service". The Oracle Internet of Things Cloud Service enables secure and reliable bidirectional communication between IoT devices and the cloud. The devices can connect to the cloud directly, or indirectly through an IoT gateway. Oracle Internet of Things Cloud Service assigns a unique digital identity to each device to establish trust relationships among devices and applications. It also enforces authentication and authorization for end-to-end communication security and to ensure proof of origin of data. It uses a cross-protocol functionality that lets any device connected to the cloud to be directly addressed, regardless of network protocol and firewall restrictions. It is also provides reliable communication between the cloud and the IoT devices, even over unreliable networks or with devices that connect intermittently. However, in other embodiments, any other cloud service can be used as a service provider, including, for example, the "AWS IoT Platform" from Amazon Corp., or the "Azure IoT Suite" from Microsoft Corp.

A DLT is a consensus of replicated, shared, and synchronized digital data geographically spread across multiple sites, countries, or institutions. Unlike with a distributed database, there is no central administrator. Although the blockchain is a form of DLT, there are also non-blockchain DLTs that can be used in embodiments.

An RPC, in distributed computing, is when a computer program causes a procedure (e.g., subroutine) to execute in a different address space, commonly on another computer on a shared network, which is coded as if it were a normal/local procedure call, without the programmer explicitly coding the details for the remote interaction. The programmer writes essentially the same code whether the subroutine is local to the executing program, or remote. This is a form of client—server interaction (i.e., the caller is client, the executor is server), typically implemented via a request—response message-passing system. In the object-oriented programming paradigm, RPCs are represented by remote method invocation ("RMI"). The RPC model implies a level of location transparency, namely that calling procedures are largely the same whether they are local or remote, but usually they are not identical, so local calls can be distinguished from remote calls. Remote calls are usually orders of magnitude slower and less reliable than local calls, so distinguishing them may be important.

Any IoT gateway 112 may watch for and act upon events and any DLT user can act as the system client, including any type of "smart" device. The functionality of an IoT device, such as an actuator's actuation process, can be invoked through an "event" that may be related to an industrial process (e.g., tighten the valve, turn on or off lights, turn on or off a device, monitor a device, etc.). Further, IoT devices 111 are identified by Uniform Resource Identifiers ("URI"s) using semantics, for example, similar to or from constrained application protocol ("CoAP") group communication. CoAP is a service layer protocol that is intended for use in resource-constrained Internet devices, such as wireless sensor network nodes (i.e., IoT sensors 111). CoAP is designed to easily translate to HTTP for simplified integration with the web, while also meeting specialized requirements such as multicast support, very low overhead, and simplicity. Multicast, low overhead, and simplicity are extremely important for IoT and Machine-to-Machine ("M2M") devices, which tend to be deeply embedded and have much less memory and power supply than traditional internet devices have.

Following the semantics of CoAP group communication, or a similar communication, an IoT device may have multiple URIs and a URI may correspond to multiple devices. The semantics of the URIs are application specific. For example, they may indicate the physical location of a device (e.g., "factory2/floor1/operatingroom"). IoT gateway 112 is aware of the URIs and the supported operations of the devices attached to it by, for example, using an out-of-band configuration mechanism, or using a service discovery protocol. Smart contract 104, whose address is considered well-known throughout system 150, is then invoked to generate the appropriate DLT events.

The DLT event has a name and some attributes. A service provider (i.e., an RPC client) may request to watch the events produced by a smart contract by specifying the event name and optionally a filter over indexable attributes. To provide improved authentication security, an authorization system uses both a unique token and an integrity measurement value to authenticate a device. A unique token is assigned to a device when the device registers with an authentication system. After registration, the device begins periodically transmitting an integrity measurement value to the network authorization system. The integrity measurement value is calculated by the device and indicates the relative health of the device based on data gathered by the device. The authorization system stores the received integrity measurement values in an authorization blockchain along with data identifying the device.

The device authenticates with the authorization system to receive an access token, which the device can use to access available services. The access token has an associated expiration time, after which the access token is void and the device has to again authenticate with the authentication system to receive a new access token. To authenticate with the authentication system, the device transmits an authentication request to the authentication system that includes the unique token assigned to the device. The device encrypts the unique token prior to transmission.

Upon receiving the authentication request, the authentication system verifies the unique token and accesses the latest integrity measurement value for the device from the authentication blockchain. The authentication system then generates an access token for the device based on the integrity measurement value and provides the generated access token to the device. For example, in some embodiments, the authentication system compares the integrity measurement value to a threshold integrity measurement value to ensure that the device has not been tampered with. The authentication system does not provide the access token to the device if the integrity measurement value is determined to be less than the threshold integrity measurement value.

In embodiments, the authorization system is a cyber-physical system ("CPS") which is the basic technology platform for IoT and IIoT. CPS is the primary enabler to connect physical machines that were previously disconnected. CPS integrates the dynamics of the physical process with those of software and communication, providing abstractions and modeling, design, and analysis techniques.

In the smart contract architecture in accordance to embodiments, a generic event name includes three attributes: (1) an extended validation ("EV") code "Ev Code" that encodes the desired operation; (2) a URI attribute that corresponds to the URI of the device(s) in which Ev Code is applied; and (3) a "DepEvCode" that corresponds to the dependency operation code for the desired operation. For example, before invoking an operation event called "Turn On Fan", there is a dependency event for this operation to make sure that the fan is operational. Without an operational fan there is no point in invoking the operation/event such as "turn on fan".

The EV code is related to code signing, which is the process of digitally signing executables and scripts to confirm the software author and guarantee that the code has not been altered or corrupted since it was signed. The process employs the use of a cryptographic hash to validate authenticity and integrity. The most common use of code signing is to provide security when deploying. Almost every code signing implementation will provide some sort of digital signature mechanism to verify the identity of the author or build system, and a checksum to verify that the object has not been modified. It can also be used to provide versioning information about an object or to store other metadata about an object. EV code signing certificates are subject to additional validation and technical requirements. These guidelines are based on the CA/B Forum's Baseline Requirements and Extended Validation Guidelines.

The IoT gateways register to their RPC server (i.e., service provider) to watch the event operation (i.e., any IoT operations) of the smart contract and (optionally) specify filters on the event's attributes. The clients simply interact with the smart contract and call the appropriate functions. The main function of the smart contract is called "initiateEvent." This function accepts three input parameters: an EV code, a DepEvCode, and a URI, and generates an operation event whose attributes have the same value as the function call parameters. Eventually, this event reaches the IoT gateways 112 that are watching for it. In return, each IoT gateway 112 invokes the corresponding operation at the IoT devices 111 that are associated with the specified URI.

Figure 3:
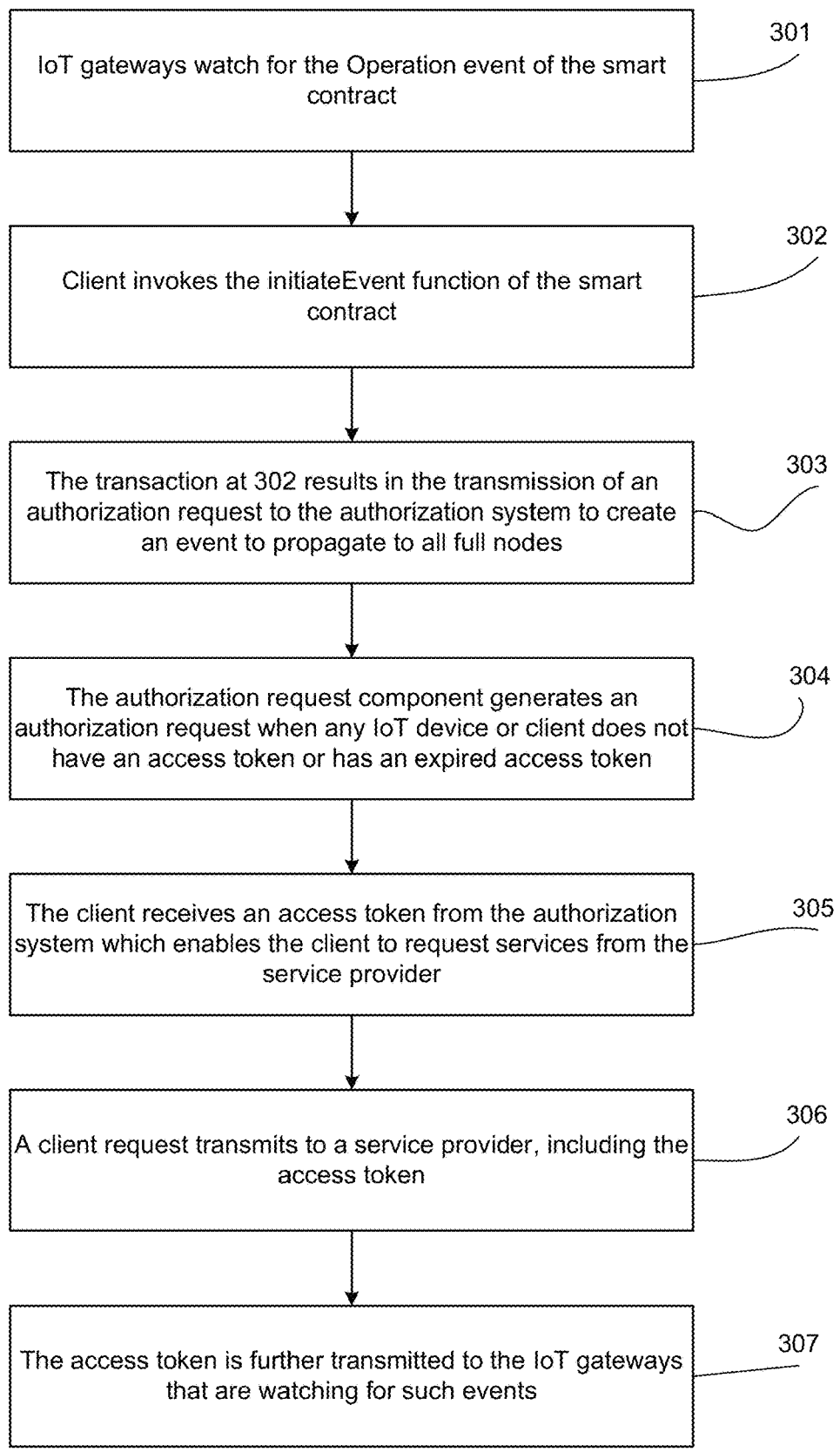
FIG. 3 is a flow diagram of the functionality of the smart production system of FIG. 1 in accordance with one embodiment.

FIG. 3 is a flow diagram of the functionality of smart production system 150 of FIG. 1 in accordance with one embodiment. In one embodiment, the functionality of the flow diagram of FIG. 3 (and FIG. 4 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

An example described in FIG. 3 will include a client, two IoT gateways 112, and two IoT devices 111 attached to each gateway 112, an authorization system, and a service provider.

At 301, one of the IoT gateways 112 starts watching for the operation event of the smart contract located at the respective smart contract blockchain address. Further, the gateway 112 requests events to be filtered based on their EvCode and specifies that it wants to watch only for events in which EvCode is "TightenValue" or any other EvCode value.

At 302, at some point a client invokes the initiate Event function of the smart contract. It uses as the URI a URI that matches the IoT devices 111 that correspond to gateway 112 of 301 and as EvCode "TightenValue".

At 303, the transaction at 302 results in the transmission of an authorization request to the authorization system to create an event to propagate to all full nodes.

At 304, the authorization request component generates an authorization request when any IoT device or client does not have an access token or has an expired access token. To generate the authorization request, the authorization request component encrypts the unique token assigned to the IoT device. For example, the authorization request component encrypts the unique token using a private key. Once the unique key is encrypted, the authorization request component transmits the authorization request, including the encrypted unique token, to the authorization system.

At 305, the client receives an access token from the authorization system. The access token enables the client to request services from the service provider. The access token has an associated expiration time, after which the access token is no longer valid and therefore cannot be used by the client to access services from the service provider. Accordingly, the client would have to again authenticate with the authentication system to receive a new access token. Similarly, the IoT device receives an access token from the authorization system. The access token enables the IoT device to request services from the service provider. The access token has an associated expiration time, after which the access token is no longer valid and therefore cannot be used by the IoT device to access services from the service provider. Accordingly, the IoT device would have to again authenticate with the authentication system to receive a new access token.

At 306, a client request transmits to a service provider, including the access token. The service provider uses the included access token to determine whether to approve the request. In some use cases in which the access token is appended with additional data (e.g., the integrity measurement value or the integrity measurement value range), the service provider may use the appended data to determine whether to approve or deny a request received from the IoT device for a service provided by the service provider. For example, the service provider may compare the integrity measurement value to a threshold integrity measurement value to determine whether to approve or deny the service request. Alternatively, the service provider may compare the integrity measurement value range to a threshold integrity measurement value range to determine whether to approve or deny the service request.

At 307, the access token is further transmitted to the IoT gateways that are watching for such events. The gateway extracts the URI of the event and checks if it matches any of the IoT devices attached to it.

As disclosed in conjunction with FIG. 3, the authorization request component in embodiments is the CPS with Smart Contract component. This component integrates the networking, computing, and physical processes, where modern sensors handle its major components efficiently, such as a cyber system and a physical process which avoids the security vulnerabilities while interacting between these two components increases. Embodiments include physical systems using blockchain, which secures and executes transactions in an open network environment without the involvement of any centralized third-party system. The blockchain is a distributed ledger, which records all transactions into the chain of blocks. A transaction is being verified by all the participating members of a blockchain before storing it into the chain of blocks. A decentralized consensus algorithm, proof-of-eligibility Byzantine Fault Tolerance ("peBFT"), disclosed below, is used for data synchronization in the peer-to-peer (P2P) blockchain network The peers' nodes need a digital agreement (i.e., the smart contract) to complete a transaction that can be self-executable, self-verifiable, and self-enforced.

Many legacy access control mechanisms implement access control using "tokens" that indicate the capabilities of a client over a resource. However, token management, security, and semantics interpretation cannot be trivially implemented, especially in the context of the IoT. In contrast, embodiments of the invention leverages the capability of the distributed ledger technology to support "custom tokens" to implement an access control mechanism.

Specifically, distributed ledger (blockchain) technology has specified a token standard called Ethereum Request for Comment-20 or "ERC-20." An ERC-20 token is a blockchain-based asset with similar functionality to bitcoin, ether, and bitcoin cash in that it can hold value and be sent and received. However, one difference between ERC-20 tokens and other cryptocurrencies is that ERC-20 tokens are created and hosted on the Ethereum blockchain, whereas bitcoin and bitcoin cash are the native currencies of their respective blockchains.

The ERC-20 standard defines some functions that a smart contract should implement in order to be treated as a token. The smart contract of the architecture disclosed herein in embodiments implements functions defined by the ERC-20 standard. In embodiments, an ERC-20 token is generated for each event that is described above. ERC-20 tokens are stored in wallets protected by an 256-character seed, similar to the AES 256 password. To access and spend the tokens, the service provider provides a cryptocurrency wallet. A hardware wallet can be used to keep credentials offline while facilitating transactions. Each event is considered a transaction.

These extensions can be used for providing access control as follows. Initially a user that owns the smart contract assigns all tokens to themself and refer to this user as the owner. The owner then transfers at least one token to each authorized client to show the proof-of-eligibility. The number of tokens a client owns can be used as an indication of the client's role (i.e., the more tokens the client owns the more privileged the client's role). The contract owner can protect an operation by specifying the roles of the authorized clients. Therefore, in the simplest case, an operation can be protected simply by having the smart contract function checking if the client that invokes it owns the necessary number of tokens.

Using the proof-of-eligibility consensus algorithm disclosed herein, it is possible to define "critical" functions, that require the "approval" of a client that holds a more privileged ("eligibility") role. In particular, if such a function is invoked by an underprivileged client, instead of producing an operation event, a new type of event is produced, referred to as an "Authorization Request." This event is handled by a privileged client, who inspects its fields and acts accordingly (i.e., the client may ignore or may invoke the same function again so that the operation event is generated).

Proof-of-Eligibility (peBFT) Consensus Algorithm

In general, a consensus algorithm is a procedure through which all the peers of the blockchain network reach a common agreement about the present state of the distributed ledger. In this way, consensus algorithms achieve reliability in the blockchain network and establish trust between unknown peers in a distributed computing environment. A consensus protocol makes sure that every new block that is added to the blockchain is the one and only version of the truth that is agreed upon by all the nodes in the blockchain. The blockchain consensus protocol consists of some specific objectives such as coming to an agreement, collaboration, co-operation, equal rights to every node, and mandatory participation of each node in the consensus process.

Embodiments implement a novel proof-of-eligibility (peBFT) consensus algorithm that works efficiently in asynchronous systems (i.e., no upper bound on when the response to the request will be received) and can be incorporated into the existing blockchain architecture. Embodiments solve many technical problems associated with known fault tolerance solutions (e.g., Proof of Work ("PoW"), Proof of Stake ("PoS"), etc., consensus algorithms) by implementing an approach that the more tokens a client owns the more privileged the client's eligibility. Embodiments improve on known Byzantine Fault Tolerance solutions in that with embodiments the more tokens a client owns the more privileged the client's eligibility.

Figure 4:
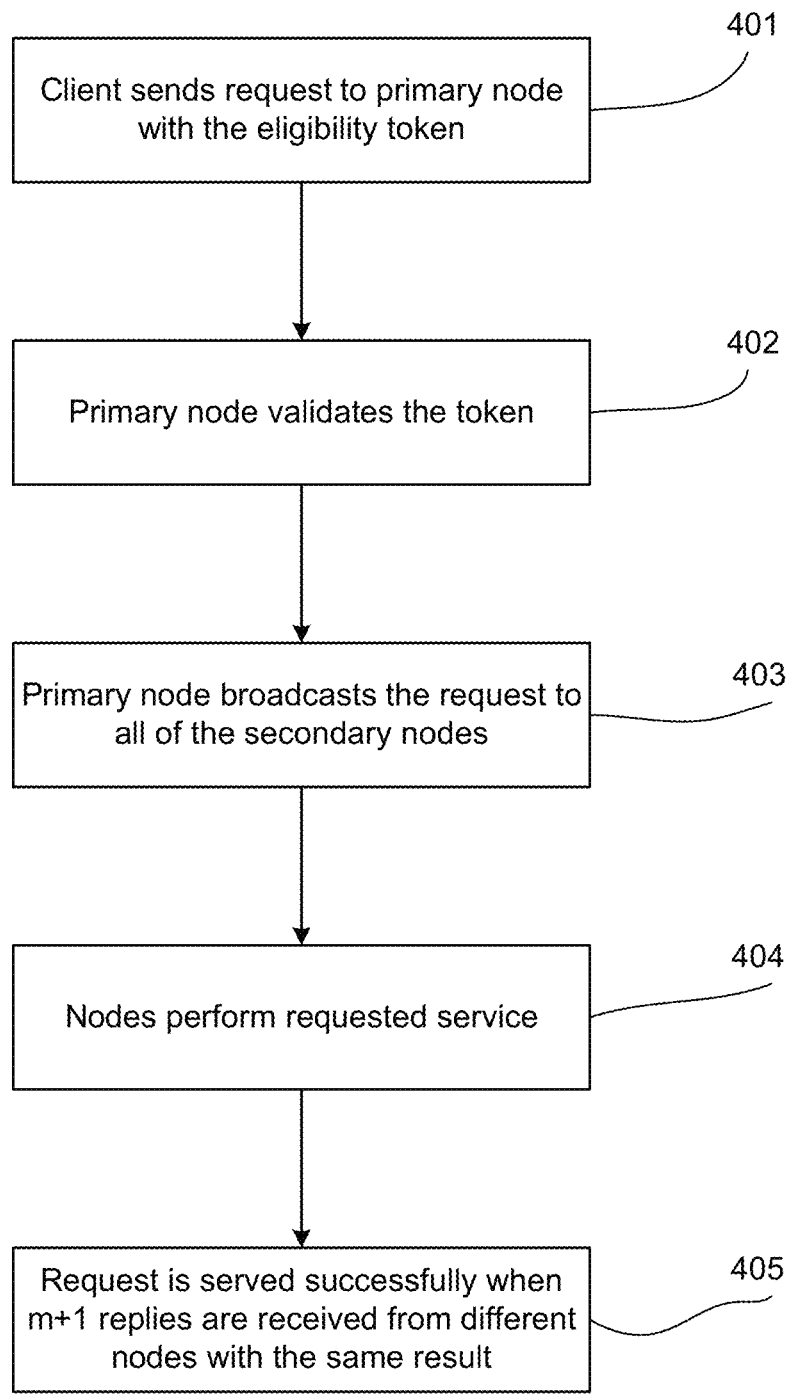
FIG. 4 is a flow diagram of a proof-of-eligibility ("peBFT") consensus algorithm executed by the smart production system of FIG. 1 in accordance with one embodiment.

FIG. 4 is a flow diagram of a proof-of-eligibility (peBFT) consensus algorithm executed by smart production system 150 of FIG. 1 in accordance with one embodiment. In embodiments, each consensus round of peBFT are broken into 5 phases, as indicated by the phases of FIG. 4. Similar to BFT, peBFT is the feature of a distributed network to reach consensus (i.e., agreement on the same value) even when some of the nodes in the network fail to respond or respond with incorrect information. peBFT is used to safeguard against the system failures by employing collective decision making which aims to reduce to influence of the faulty nodes. Further, as disclosed below, with peBFT embodiments any full node can learn the token balance of a user without interacting with the corresponding smart contract and therefore the number of tokens is considered for proof-of eligibility.

peBFT can be achieved if the correct number of working nodes in the network reach an agreement on their values. There can be a default vote value given to missing messages (i.e., an assumption that the message from a particular node is "faulty" if the message is not received within a certain time limit). Further, a default response can be assigned if the majority of nodes respond with a correct value.

Two categories of failures are considered. One is fail-stop, in which the node fails and stops operating, and the other is arbitrary-node failure. Some of the arbitrary node failures include failure to return a result, respond with an incorrect result, respond with a deliberately misleading result and respond with a different result to different parts of the system.

Nodes in a peBFT enabled distributed system, in accordance to embodiments, are sequentially ordered with one node being the primary (i.e., the leader node) and others referred to as secondary (i.e., backup nodes). Any eligible node in the system can become the primary by transitioning from secondary to primary, typically in the case of a primary node failure. The goal is that all honest nodes help in reaching a consensus regarding the state of the system using the majority rule, as well as using a more privileged status of a node based on an amount of tokens the node holds.

At 401, the client sends a request to the primary (i.e., leader) node with the eligibility token. In one embodiments, the token is an ERC-20 token, which is a standard fungible token (i.e., is exactly the same in type and value as another token) for Ethereum. However, any type of fungible token can be used in other embodiments.

At 402, the primary node validates the token with a token provider (e.g., any crypto wallet provider) to make sure the provided eligibility token is legitimate.

At 403, the primary node then broadcasts the request to all of the secondary (i.e., backup) nodes. In general, backup nodes exist because if the private keys for a node's addresses are not being deliberately stored outside its wallet, then it is vital to back up the wallet and its keys. If the private key for an address is permanently lost, no more transactions can be performed on behalf of that address. Further, if a node needs to recover quickly from a system failure, without the delay caused by retrieving and reindexing the blockchain's contents, then it may make sense to back up the node's entire state instead.

At 404, the nodes (primary and secondaries) perform the service requested and then send back a reply to the client.

At 405, the request is served successfully when the client receives "m+1" replies from different nodes in the network with the same result, where m is the maximum number of faulty nodes allowed. When the client receives the reply, the client receives the token and the number of tokens is calculated by the number of successful requests that has completed within the smart contract. Each time the request is served, a token is received and the number of collected tokens is considered for proof of eligibility.

In embodiments, the consensus rounds of 401-405 are repeated and the primary (leader) node is changed during every view (i.e., every peBFT consensus round) and can be substituted by a view change protocol if a predefined quantity of time has passed without the leading node broadcasting a request to the backups (secondary). If needed, a majority of the honest nodes can vote on the legitimacy of the current leading node and replace it with the next round-robin node in line.

As a result of the consensus rounds, the proof of eligibility is determined based on the number of successful requests served by the node. Whenever a node serves the request successfully it receives the token and the tokens are counted in order to determine the proof of eligibility within the smart contract.

Two-Steps Access Control

In embodiments, since the distributed ledger is distributed, which is a key property of blockchain-based systems, any full node can learn the token balance of a user without interacting with the corresponding smart contract. This property enables the definition of additional and possibly finer grained access control policies at the IoT gateways. Therefore, even if a client is authorized by the smart contract, eventually the operation may be rejected by some/all IoT gateways. The access control policies defined at the IoT gateways may take into consideration, in addition to the role of the client (as indicated by the number of tokens held by the client), other auxiliary information provided by the real world, such as time, location information, other IoT measurements, etc. Smart contracts do not have access to such information.

Artificial Neural Network Model

One embodiment incorporates a Deep Convolutional Generative Adversarial Network ("DCGAN"), shown as machine learning 103 in FIG. 1, to detect the defects in parts at even earlier stages through inline quality control. For example, with an IoT system composed of a set of IoT devices in which each IoT device owns a set of its previously transmitted data points, machine learning 103 can follow a distribution of data points with time series, device records, or device health monitoring datasets depending on the condition monitoring IoT application.

Embodiments include data points from the normal state of the IoT device in which there is no defects to the IoT. In this model, every IoT device tries to learn a generator distribution over its available dataset and use that distribution to detect the defects and abnormal behavior to the system. The defects or abnormal behavior in an Industry 4.0 system is any activity that causes an IoT device to communicate data points which do not follow its data distribution. Further, if an IoT device knows the distribution of its own normal state, it can discriminate a data point that is not similar to the normal state distribution.

To learn the distribution at every IoT device, embodiments define a prior input noise with distribution and a mapping artificial neural network ("ANN") with parameters from this random variable to data space. An ANN typically includes artificial neurons and activation functions which map an input to an output. Embodiments define another ANN element, a discriminator, for every IoT device that receives a data point and outputs a value between 0 and 1. When the output of the discriminator is closer to 1, then the received data point is a normal state and when the output is closer to 0 then the received data is from an abnormal IoT device. In embodiments, every IoT device includes a corresponding discriminator.

Every IoT device's generator ANN tries to generate data points close to the normal state data in order to find the best approximation of data points. On the other hand, every IoT device's discriminator aims at discriminating the generated data points from its own dataset. The generated data points actually mimic an anomalous state of the system because they are generated from a generator distribution that is not equal to data point distribution, because parameters are randomly chosen for an untrained ANN. Therefore, the discriminator outputs 0 values for the generator. Therefore, the generator and discriminator at every IoT device interact to find the optimal parameters and distributions such that the generator can generate data points close to the normal state while the discriminator can discriminate between the abnormal and normal data points.

The value of the discriminator and generator model structure of embodiments of the invention jointly quantifies how close is the generator's generated data points to the normal state and how good the discriminator can discriminate between the normal and abnormal data points. In this model structure, the first iteration is defined to force the discriminator to produce values equal to 1 for real data. Meanwhile, the second iteration penalizes any abnormal point generated by the generators. While every IoT device's generator will seek to minimize the value of the model, the discriminator tries to maximize this value. Therefore, the optimal solutions for the discriminator and generator can be derived from the argument of the minimum (arg min) and the argument of the maximum (arg max) of data points of discriminators and generators.

However, since every IoT device has access to only its own dataset, the optimization problem is for a standalone conditional monitoring in which every IoT device has access only to its own dataset. In embodiments, the Deep Convolutional Generative Adversarial Network ("DCGAN") applies a deep network in combination with an adversary network to produce IoT device parts higher resolution images. A DCGAN network typically takes in a 100×1 noise vector, denoted z, and maps it into the G(Z) output which is 64×64×3. The DCGAN architecture allows a first layer to expand the random noise. The network goes from 100×1 to 1024×4×4. This layer is denoted project and reshape. DCGAN is more appealing to a human with more details compared with the similar design without GAN (i.e., a residual neural network ("ResNet")).

During training, the generator progressively becomes better at creating images that look real, while the discriminator becomes better at telling them apart. The process reaches equilibrium when the discriminator can no longer distinguish real images from fakes.

Embodiments of the invention use the discriminators (i.e., a first discriminator for known defects, a second discriminator for unknown defects) to distinguish the IoT device images and back propagate the GAN loss to train the discriminator and the generator. The core of the DCGAN architecture uses a standard convolutional neural network ("CNN") architecture on the discriminative model.

For the generator, convolutions are replaced with upconvolutions, so the representation at each layer of the generator is actually successively larger, as it maps from a low-dimensional latent vector onto a high-dimensional image.

Figure 5:
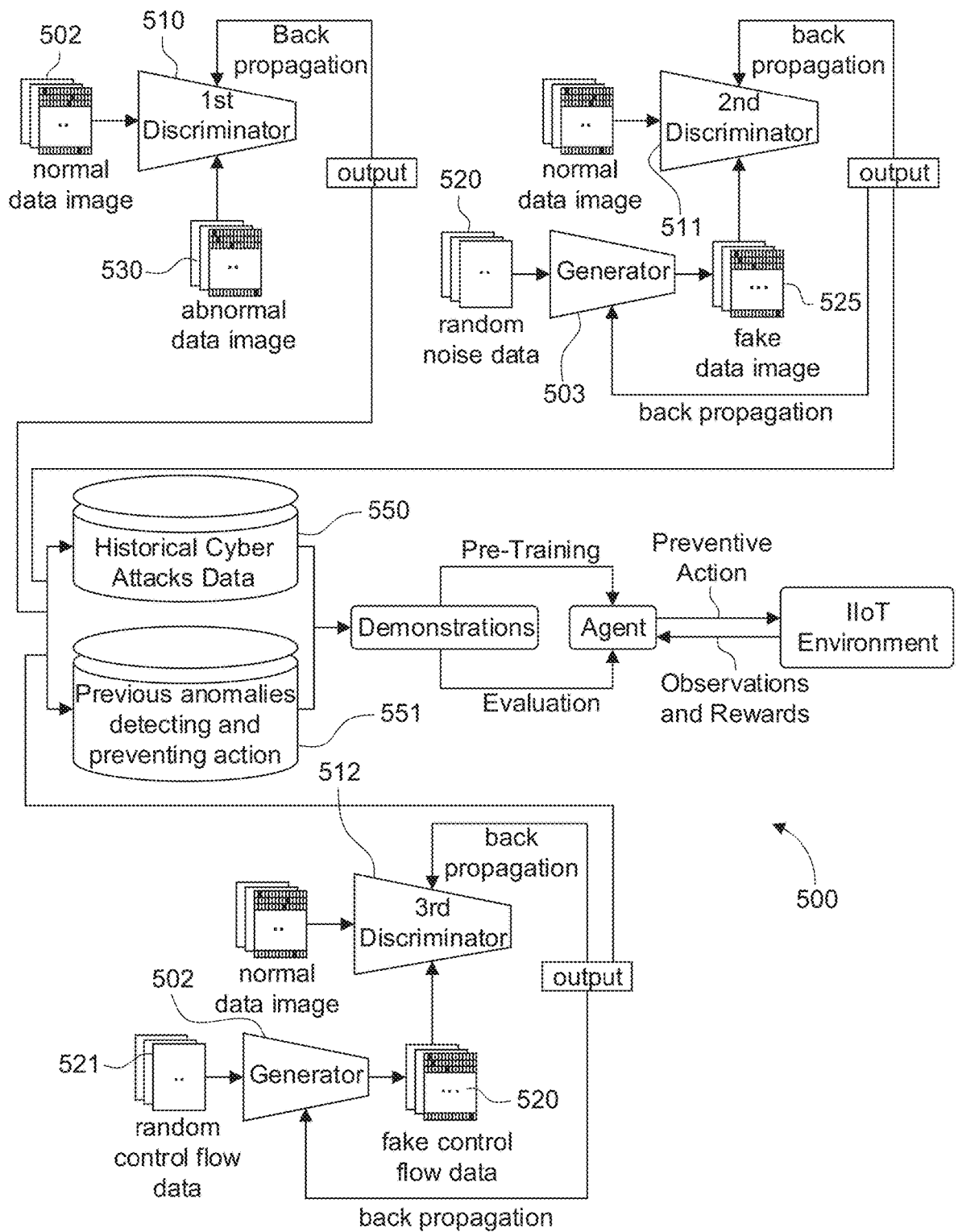
FIG. 5 illustrates an example Deep Convolutional Generative Adversarial Network ("DCGAN") architecture in accordance to embodiments of the invention.

FIG. 5 illustrates an example DCGAN architecture 500 in accordance to embodiments of the invention. DCGAN network 500 includes generators 502-503, and discriminators 510-512. The generators are fed some noise data 520, 521 and generate fake data 525, 526 that are fed into the discriminators, along with fake images 530. Back propagation is also fed into the discriminators. Additional generators/discriminators can be added.

In general, for network 500, the generators generate candidates while the discriminators evaluate them. The contest operates in terms of data distributions. Typically, the generative network learns to map from a latent space to a data distribution of interest, while the discriminative network distinguishes candidates produced by the generator from the true data distribution. The generative network's training objective is to increase the error rate of the discriminative network (i.e., "fool" the discriminator network) by producing novel candidates that the discriminator thinks are not synthesized (i.e., are part of the true data distribution)).

Known datasets 550, 551 serve as the initial training data for the discriminators. Training each discriminator involves presenting it with samples from the training dataset, until it achieves acceptable accuracy. Each generator trains based on whether it succeeds in fooling the discriminator. Typically the generator is seeded with randomized input that is sampled from a predefined latent space (e.g. a multivariate normal distribution). Thereafter, candidates synthesized by the generator are evaluated by the discriminator. Independent backpropagation procedures are applied to both networks so that the generator produces better images, while the discriminator becomes more skilled at flagging synthetic images. The generator is a deconvolutional neural network, and the discriminator is a convolutional neural network in embodiments.

Further, in one embodiment, in network 500 any pooling layers are replaced with strided convolutions (discriminator) and fractional-strided convolutions (generator). Batch normalization is used in both the generator and the discriminator. Fully connected hidden layers are removed for deeper architectures. Embodiments use rectified linear unit activation ("ReLU") in the generators for all layers except for the output, which uses Tanh. Embodiment further used LeakyReLU activation in the discriminator for all layers.

The use of DCGAN 500 enables the finding of IIoT fraud. GAN with deep convolution provides a novel fault diagnosis approach based on generative adversarial networks (GAN) for imbalanced industrial time series where normal samples are much larger than failure cases. A well-designed feature extractor with GAN is combined to help train the whole network. Embodiments are designed to obtain data distribution and hidden pattern in both original distinguishing features and latent space. Specifically, the encoder-decoder-encoder three-sub-network is employed in GAN, based on Deep Convolution Generative Adversarial Networks (DC-GAN) but without Tanh activation layer and only trained by a normal sample.

As disclosed, embodiments implement a smart production system that uses decentralized trust to track and avoid any fraud in manufacturing for Industry 4.0 (or other smart manufacturing) using distributed ledger technology. Embodiments include a Proof-Of-Eligibility (peBFT) consensus algorithm with a token-based two-steps access control. Embodiments further detect the defects in parts at even earlier stages through inline quality control using a machine learning algorithm, including a Deep Convolutional Generative Adversarial Network.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of monitoring a plurality of industrial Internet of Things (IoT) devices, using a distributed ledger, the method comprising:

coupling a corresponding IoT gateway to each IoT device of the plurality of IoT devices, each IoT gateway monitoring for operation events of a smart contract of the distributed ledger, each IoT device and IoT gateway coupled to the distributed ledger;

in response to a client initiating an operation of a first IoT device of the plurality of IoT devices, generating a corresponding operation event by the smart contract and transmitting an authorization request to an authorization system and receiving an access token corresponding to the operation, wherein the operation comprises performing a functionality of the first IoT device and the access token corresponds to an integrity measurement value for the first IoT device and an approval of the authorization request is based at least on the integrity measurement value;

transmitting the access token to one or more of the IoT gateways, each IoT gateway monitoring for the operation event and determining whether the operation event corresponds to the first IoT device and then implementing the operation at the first IoT device; and determining a defect in any of the IoT devices using a trained Deep Convolutional Generative Adversarial Network (DCGAN) model coupled to the distributed ledger and comprising a corresponding discriminator and generator for each of the IoT devices, each of the IoT devices having a normal distribution set of data points, the DCGAN model monitoring transmitted data points from each of the IoT devices and detecting when the transmitted data points do not correspond to the normal distribution set of data points.

2. The method of claim 1, further comprising training the DCGAN model, the training comprising:

each generator generating data points substantially close to the normal distribution set of data points for each corresponding IoT device, the data points including noise data;

each discriminator discriminating the generated data points from the normal distribution set of data points; and repeating the generating and discriminating until each discriminator achieves an acceptable accuracy.

3. The method of claim 2, wherein the discriminators comprise a convolutional neural network and the generators comprise a deconvolutional neural network.

4. The method of claim 1, wherein the distributed ledger is a blockchain network.

5. The method of claim 1, wherein the event comprises an event name, the event name comprising:
an extended validation code that encodes a desired operation;
a Uniform Resource Identifier (URI) that corresponds to a URI of the first IoT device; and
a dependency operation code for the desired operation.

6. The method of claim 5, wherein each of the IoT gateways request operation events to be filtered by the extended validation code.

7. The method of claim 1, the authorization request further transmitted to a cloud service provider that uses the integrity measurement value to determine whether to approve the request.

8. The method of claim 1, wherein the token comprises an Ethereum Request for Comment-20 token.

9. The method of claim 1, wherein the smart contract can determine a number of tokens held by the client, the number of tokens indicative of a role of the client and used to determine whether to authorize the operation.

10. A smart production system comprising:
a plurality of industrial Internet of Things (IoT) devices;
a corresponding IoT gateway coupled each IoT device of the plurality of IoT devices, each IoT gateway monitoring for operation events of a smart contract of a distributed ledger, each IoT device and IoT gateway coupled to the distributed ledger;
one or more processors, in response to a client initiating an operation of a first IoT device of the plurality of IoT devices, generating a corresponding operation event by the smart contract and transmitting an authorization request to an authorization system and receiving an access token corresponding to the operation, wherein the operation comprises performing a functionality of the first IoT device and the access token corresponds to an integrity measurement value for the first IoT device and an approval of the authorization request is based at least on the integrity measurement value;
the one or more processors transmitting the access token to one or more of the IoT gateways, each IoT gateway monitoring for the operation event and determining whether the operation event corresponds to the first IoT device and then implementing the operation at the first IoT device; and
a trained Deep Convolutional Generative Adversarial Network (DCGAN) model coupled to the distributed ledger and determining a defect in any of the IoT devices, the DCGAN model comprising a corresponding discriminator and generator for each of the IoT devices, each of the IoT devices having a normal distribution set of data points, the DCGAN model monitoring transmitted data points from each of the IoT devices and detecting when the transmitted data points do not correspond to the normal distribution set of data points.

11. The smart production system of claim 10, the one or more processors further training the DCGAN model, the training comprising:
each generator generating data points substantially close to the normal distribution set of data points for each corresponding IoT device, the data points including noise data;
each discriminator discriminating the generated data points from the normal distribution set of data points; and
repeating the generating and discriminating until each discriminator achieves an acceptable accuracy.

12. The smart production system of claim 11, wherein the discriminators comprise a convolutional neural network and the generators comprise a deconvolutional neural network.

13. The smart production system of claim 10, wherein the distributed ledger is a blockchain network.

14. The smart production system of claim 10, wherein the event comprises an event name, the event name comprising:
an extended validation code that encodes a desired operation;
a Uniform Resource Identifier (URI) that corresponds to a URI of the first IoT device; and
a dependency operation code for the desired operation.

15. The smart production system of claim 14, wherein each of the IoT gateways request operation events to be filtered by the extended validation code.

16. The smart production system of claim 10, the authorization request further transmitted to a cloud service provider that uses the integrity measurement value to determine whether to approve the request.

17. The smart production system of claim 10, wherein the token comprises an Ethereum Request for Comment-20 token.

18. The smart production system of claim 10, wherein the smart contract can determine a number of tokens held by the client, the number of tokens indicative of a role of the client and used to determine whether to authorize the operation.

19. A non-transitory computer-readable medium storing instructions which, when executed by at least one of a plurality of processors, cause the processors to monitor a plurality of industrial Internet of Things (IoT) devices, using a distributed ledger, the monitoring comprising:
coupling a corresponding IoT gateway to each IoT device of the plurality of IoT devices, each IoT gateway monitoring for operation events of a smart contract of the distributed ledger, each IoT device and IoT gateway coupled to the distributed ledger;
in response to a client initiating an operation of a first IoT device of the plurality of IoT devices, generating a corresponding operation event by the smart contract and transmitting an authorization request to an authorization system and receiving an access token corresponding to the operation, wherein the operation comprises performing a functionality of the first IoT device and the access token corresponds to an integrity measurement value for the first IoT device and an approval of the authorization request is based at least on the integrity measurement value;
transmitting the access token to one or more of the IoT gateways, each IoT gateway monitoring for the operation event and determining whether the operation event corresponds to the first IoT device and then implementing the operation at the first IoT device; and
determining a defect in any of the IoT devices using a trained Deep Convolutional Generative Adversarial Network (DCGAN) model coupled to the distributed ledger and comprising a corresponding discriminator and generator for each of the IoT devices, each of the IoT devices having a normal distribution set of data points, the DCGAN model monitoring transmitted data points from each of the IoT devices and detecting when the transmitted data points do not correspond to the normal distribution set of data points.

20. The computer-readable medium of claim 19, further comprising training the DCGAN model, the training comprising:
- each generator generating data points substantially close to the normal distribution set of data points for each corresponding IoT device, the data points including noise data;
- each discriminator discriminating the generated data points from the normal distribution set of data points; and
- repeating the generating and discriminating until each discriminator achieves an acceptable accuracy.

* * * * *